Aug. 16, 1927.

J. H. SHARP 1,639,314

AUTOMOBILE THEFT ALARM

Filed Jan. 8, 1925

Witnesses:
W. F. Kilroy
Harry W. White

Inventor:
John H. Sharp
By Hill & Hill Attys

Aug. 16, 1927.
J. H. SHARP
1,639,314
AUTOMOBILE THEFT ALARM
Filed Jan. 8, 1925   3 Sheets-Sheet 2
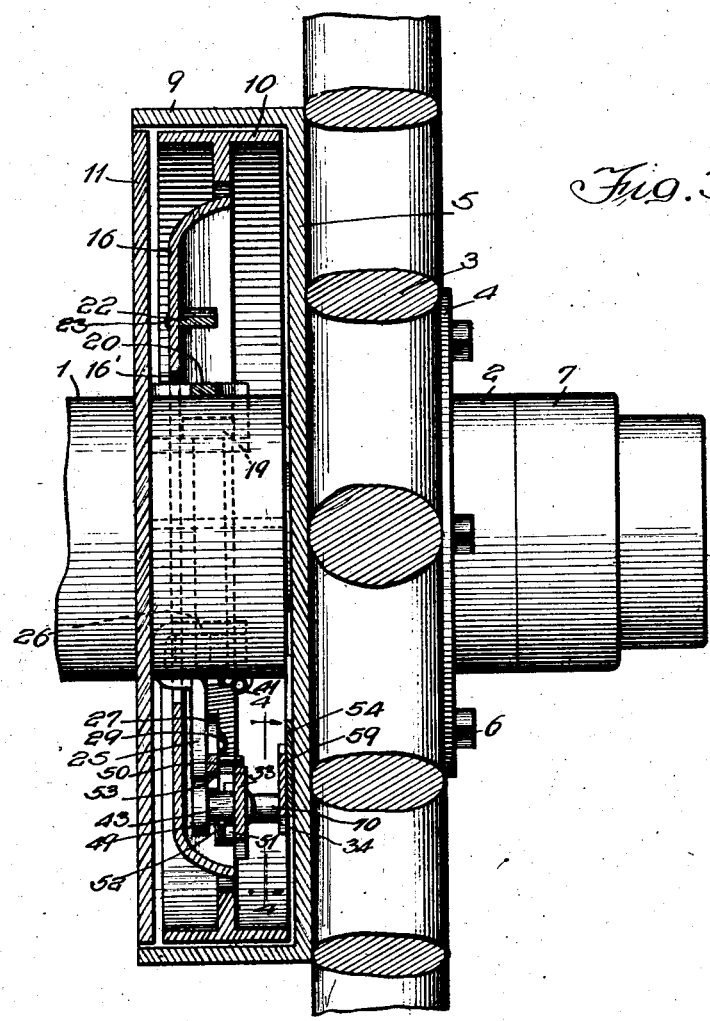

Aug. 16, 1927.  
J. H. SHARP  
1,639,314  
AUTOMOBILE THEFT ALARM  
Filed Jan. 8, 1925 3 Sheets-Sheet 3
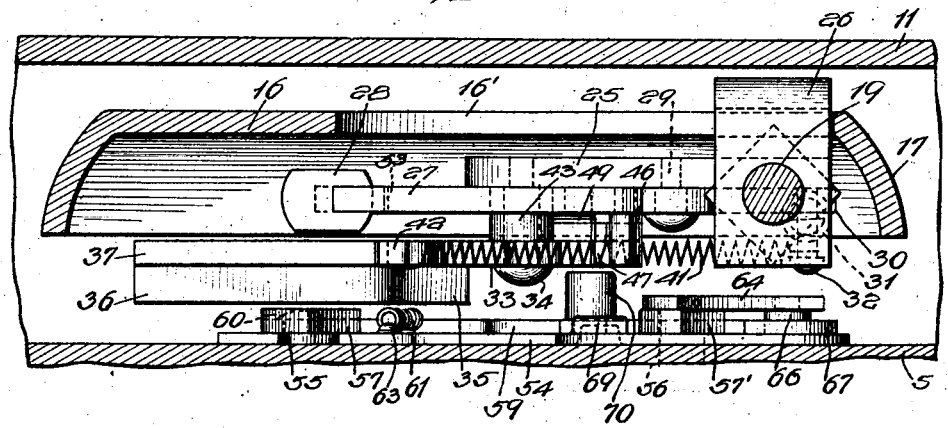
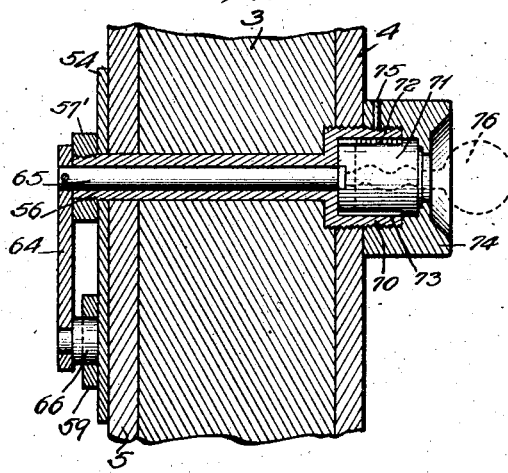
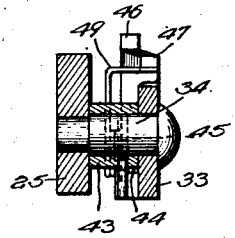
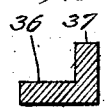
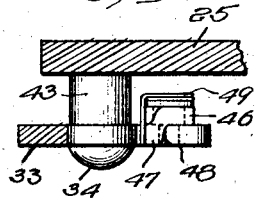
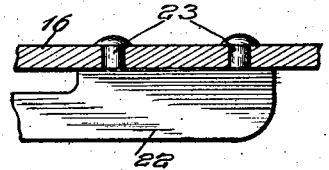
Witnesses:
W. F. Kilroy
Harry B. White
Inventor:
John H. Sharp
By Patented Aug. 16, 1927.

1,639,314

UNITED STATES PATENT OFFICE.

JOHN H. SHARP, OF CHICAGO, ILLINOIS.

AUTOMOBILE THEFT ALARM.

Application filed January 8, 1925. Serial No. 1,307.

My invention belongs to that general class of devices known as alarms, and relates more particularly to an audible alarm for use on automobiles or like vehicles, and which is automatically operative upon and during unauthorized use of the automobile. The present invention is in the nature of an improvement on the device shown in my Patent No. 1450336, granted April 3, 1923. The invention has among its objects the production of an alarm of the kind described that is exceedingly simple, compact, durable, convenient, efficient and satisfactory for use wherever found applicable, and which is operative regardless whether the automobile is moved forward or backward. More particularly it has as an object the production of a device of a size that may be fitted in the brake drum of an automobile, and yet so constructed that a comparatively large, powerful gong may be employed which may be heard for considerable distances, and which is of such a type that the unauthorized user will be stopped and arrested for using a gong simulating police, fire or ambulance equipment, or a burglar alarm gong with which public is already familiar and the sounding of which immediately acquaints every one in hearing distance of the theft. The owner of the car is not affected because he does not drive the car with the gong ringing; consequently, he is violating no law or ordinance when driving on the streets. The device has among its further objects the production of a device in which the locking mechanism or controlling mechanism itself can be knocked off or destroyed without in any way shutting off the alarm. When it is locked, and only when it is locked, is the device inoperative, the same operating when unlocked so that it is not dependent upon the lock for protection. The device is particularly designed so that one size will fit practically every machine now on the market. It may be applied without requiring the drilling of holes or any particular fitting. It may be applied in any repair shop, garage, service station, or by a car owner himself, by using a jack, a wrench, and possibly a hammer. Many other objects and advantages of the construction herein shown and described will be obvious to those skilled in the art from the disclosures herein given.

To this end my invention consists in the novel construction, arrangement and combination of parts herein shown and described, and more particularly pointed out in the claims.

In the drawings, wherein like reference characters indicate like or corresponding parts:

Fig. 3 is a sectional view taken substantially on line 3—3 through the brake mechanism;

Fig. 4 is a view taken substantially on line 4—4 of Fig. 3, showing the mechanism on the brake drum carried by the wheel;

Fig. 5 is a sectional view taken substantially on line 5—5 of Fig. 2;

Fig. 6 is a sectional view taken substantially on line 6—6 of Fig. 1;

Fig. 7 is a sectional view taken substantially on line 7—7 of Fig. 2;

Fig. 8 is a sectional view taken substantially on line 8—8 of Fig. 2;

Fig. 9 is a sectional view taken substantially on line 9—9 of Fig. 2; and

Fig. 10 is a sectional view taken on line 10—10 of Fig. 2.

Figure 1:
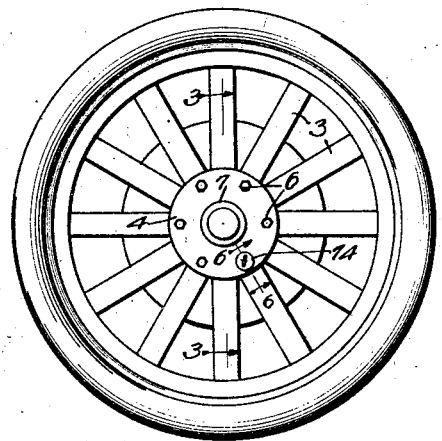
Fig. 1 is a view in elevation of a wheel equipped with my device, only the lock barrel being shown.

Referring to the drawings, in which the preferred embodiment of my invention is shown, it may be mentioned that I have not endeavored to show in detail the automobile construction, nor the complete brake mechanism.

Figure 2:
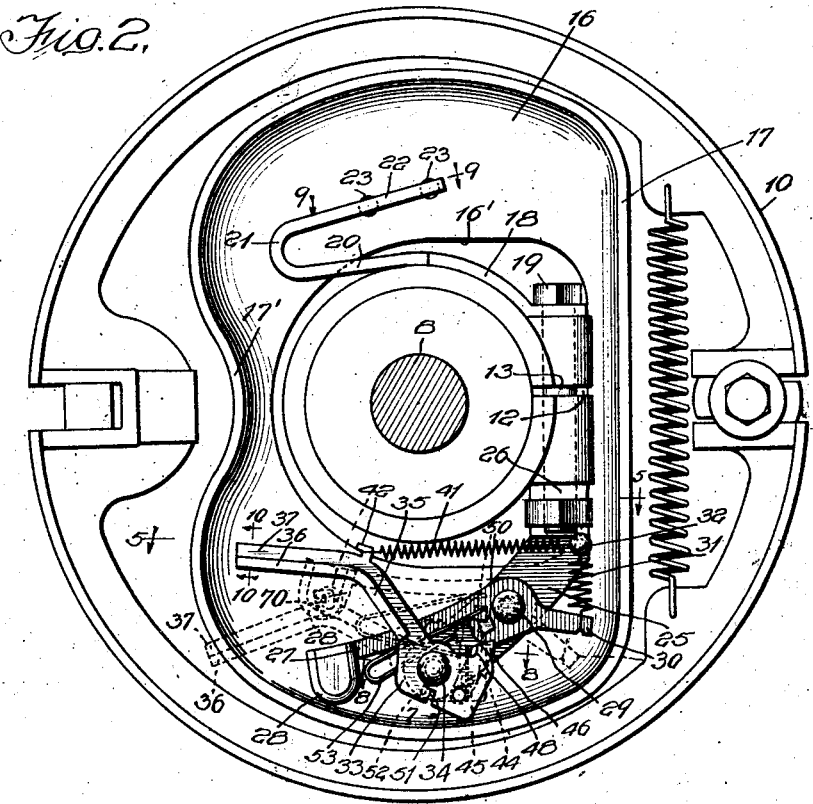
Fig. 2 is a view in elevation of a portion of the brake mechanism, the wheel and brake drum removed.

Referring particularly to Figs. 1, 2 and 3, 1 represents the axle housing; 2 the wheel hub from which extends the spokes 3, the spokes being secured in place in the usual manner between the hub flange 4 and the brake drum 5; 6 being the usual hub bolts. I have shown also the hub cap 7 which is mounted on the hub 2 and encloses the end of the axle 8, on which the wheel is suitably secured in any of the well-known ways. The brake drum includes the flange 9 arranged to cooperate with the inner and outer brake bands or either one alone, depending upon the car construction. I have only shown the internal band 10 in the drawing, the outer or external brake band and control mechanisms being omitted. Arranged on the axle housing 1 is the enclosing plate 11 which covers the internal expanding brake mechanism. I have not considered it necessary to show any of the axle bearings. Usually in connections of this kind the axle housing (see Fig. 2) containing the axle bearings is split at a desired point, as for example at 12, the same being provided with a clamping bolt 13. The internal expanding band 10 is suitably mounted in the drum, the same, together with its operating mechanism, being usually carried by the plate 11 or the equivalent. The mechanism which I have described in the preceding is more or less standard on all types of automobiles, with the possible exception of variations in proportions of the parts or the like.

My improved mechanism comprises a stationary gong and striking mechanism preferably carried by the axle housing, together with a controlling and actuating mechanism which is carried by the wheel and which cannot be tampered with to render it inoperative when set for operation. Of course, the locking mechanism itself may be varied, only the preferred arrangement being illustrated.

Referring particularly to Figs. 2, 3 and 5, 16 represents a gong member provided with an opening 16′ through which the axle housing 1 projects. The gong member may be made of any suitable material and constructed to give the desired tone. As illustrated, it is arranged to fit within the internal brake mechanism and does not interfere therewith. The same may, to some extent, vary in contour for different cars, but I prefer to make the same substantially as shown with one side straight as indicated at 17 and the other side formed as indicated at 17′, this construction making the same applicable for practically any of the automobiles on the market. The same is mounted on the axle housing by means of a bracket 18 secured under the head 19 of the bolt 13 previously referred to and extending as indicated at 20—21 and 22. The bracket and gong are secured together by the lugs 23 or equivalent means for the purpose. By so mounting the gong with the looped back bracket as shown, its vibration or sound is not affected, even with the large opening 16′ at the center, the tone being clear and strong. This opening should be large enough so that the same clears the axle housing entirely about the same. Arranged at the opposite end of the bolt 13 is a bracket 25 which is formed with an extending portion 26 which is clamped between the nut and the axle housing as most clearly shown in Figs. 2 and 3. This bracket carries a striking arm 27 provided with a hammer or head portion 28 and pivotally secured at 29 to the bracket. As shown, the striker arm has an extending portion 30, to which is connected a spring 31 having one end secured as indicated at 32.

Bracket 25 also carries trip arm 33 which is pivotally secured at 34 to the bracket in any suitable manner. The member 33 is provided with the extending portion 35—36, and is substantially a trip. As constructed, the portions 35—36 are arranged to engage a cooperating part or cam member hereinafter described carried by the wheel and operative when the vehicle is going in either direction, and which causes the ringing of the gong when the parts are set for alarm, but not otherwise.

Referring particularly to Fig. 2, the part is reinforced by the flange 37. Part 33 is normally maintained in the position shown in the full lines in Fig. 2 by means of a spring 41 which is shown secured at one end to the lug 42 and at the other end to the pin 32, it being understood that any equivalent arrangement may be provided. The member is spaced outwardly from the bracket 25 and maintained in spaced relation by means of the collar 43. Arranged on 33 is a dog or pawl 46, same being pivotally secured at 45. This dog is provided with a stop or lug 47 or the equivalent arranged to engage with the shoulder 48 on part 33, and is normally maintained in the position shown by a spring 49 or the equivalent.

Arranged on part 27 is a pin or lug 50. When 35—36 is depressed, as indicated in the dotted lines in Fig. 2, it raises the opposite end, and the pawl or dog 46 engages with the pin 50, raising the arm 27 until the pin slips off the end of the dog, at which time the spring 31 raises the end 30, bringing the gong striker 28 into action on the gong. When 35—36 returns to normal position shown in the full lines, the dog can yield about its pivot 45, thereby permitting the parts to return to normal positions. As shown, pin 51 on part 33 cooperating with pin 52 limits the upward movement of 33. I prefer to provide a spring 53 on 27, which, engaging with the sleeve 43, tends to partially retrieve the striker and prevent it remaining in engagement with the gong and thereby muffling the same.

Arranged on the brake drum plate 5 is a member 59. In the preferred construction, a plate 54 is secured on the drum by means of one of the wheel bolts 6 and a nut 57 at one end and a tubular bolt 56 and nut 57′ replacing one of the bolts 6 at the opposite end. The plate is preferably slotted as indicated at 55 and 58 so that regardless of the variation in the spacing of the bolts on different cars the device may be applied and adjusted. As shown, member 59 is pivotally secured at 60 to the plate. A spring 61 secured at 62 on the arm and at 63 on the plate tends to normally draw the arm in the position shown in the dotted lines in Fig. 4. An arm 64 carried by a bolt 65 extending through the tubular bolt 56 carries a member 66. The member 59 is provided with the notches 67 and 68, and is arranged to cooperate thereat with 66. The member 59 carries a pin or a cam lug 70 or the equivalent arranged to periodically cooperate with 35—36 when the arm 59 is in the position shown in dotted lines in Fig. 4 and the wheel turned. When the arm 64 is moved to the position shown in the dotted lines, member 59 moves up so that the pin or engaging member 70 is brought to a position to engage on 35 or on 36 and depress 35—36 and move 33. Arm 64 is controlled by suitable locking means which may be of any desired type, that shown being adapted to lock the movement of the bolt 65. A stop 69 may be provided for 59, in case the bolt 56 and nut 57' are removed by an intended thief.

A simple and yet efficient type of plate tumbler lock is shown in which the bolt is provided with a slotted barrel 71 carrying plate tumblers 72 arranged to engage in the head 70 of the tubular bolt, the head being slotted or grooved at opposite sides as indicated at 73. A part or cap 74 may be arranged on the end of the head 70 and secured against removal by a pin 75 or the equivalent. Ordinarily the pin 75 is not needed. I have shown the key 76 in dotted lines, and when the key is inserted, then the tumblers 72 are withdrawn into the barrel 71 so that the barrel can be turned by means of the key 76 shown in the dotted lines in Fig. 6, thereby turning the bolt 65 and actuating arm 64. When the key is withdrawn, the tumblers prevent actuation of the bolt. When the key is withdrawn, the part 59 is locked in the dotted position (see Fig. 4). However, it should be noted that should the lock mechanism at the outside of the wheel be knocked off, this would not in any way affect the device as it would be necessary to turn 65 and manipulate the arm 64 before the device could be released.

In operation, when the key is inserted and 64 turned as shown in the full lines in Fig. 4, part 70 or cam member is out of engaging position, and consequently turning the wheel does not bring the same into engagement with 35—36. When the same is brought to the other position, however, turning the wheel in either direction rocks member 33 on its support, thereby raising the striker arm 27 as described to the point where it is released, at which time it strikes the gong and then rebounds slightly. Continual rotation of the wheel in either direction causes the continued intermittent striking of the gong.

Obviously, the attention of any one hearing the gong would be attracted, and the owner of the car, if within hearing, will be notified. If an officer sees the car moving along the street and hears its gong being periodically struck, he will stop the same and arrest the driver for using a gong similar to the fire department, police department or an ambulance. Alarms employing a gong electrically operated are recognized as burglar alarms by the public. After a period of time and people become more accustomed to the device, officers and citizens will both immediately realize that the car is being stolen or used without authorization. It will be noted that this construction does not prevent the car from being moved in case of fire or for other reasons, although attention is attracted to such moving. The device prevents garage employees, children and others from using the car.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. In a vehicle, a frame, a wheel, a brake drum constrained to rotate with the wheel, an expanding brake band engageable with said drum, a gong disposed within the brake band, means for mounting said gong upon said frame, a clapper, means for pivotally mounting said clapper upon said frame, a lever pivotally mounted upon said frame, a pawl pivotally mounted upon said lever and engageable with said clapper, a second lever constrained to rotate bodily with said drum and pivotally mounted with respect thereto, a pin carried by said second lever and movable therewith into a position wherein it will engage the first lever when the vehicle is in motion, and means for locking said second lever in said position.

2. In a vehicle, a wheel, a brake drum constrained to rotate with the wheel, a brake band engageable with said drum, a shaft for said wheel, a housing for the shaft, a gong disposed within the brake band, means for mounting said gong upon said housing, a clapper, means for pivotally mounting said clapper upon said housing, a lever pivotally mounted upon said housing, a pawl pivotally mounted upon said lever and engageable with said clapper, a second lever constrained to rotate bodily with said drum and pivotally mounted with respect thereto, a pin carried by said second lever and movable therewith into a position wherein it will engage the first lever when the vehicle is in motion, and a lock carried by the wheel and accessible from the outer side thereof for securing said second lever in said position.

3. In a vehicle, a wheel, a brake drum constrained to rotate with the wheel, a brake band engageable with said drum, a shaft for said wheel, a housing for the shaft, a gong disposed within the brake drum, means for mounting said gong upon said housing, a clapper, means for causing said clapper to strike said gong, and a lock carried by said wheel and accessible from the outer side thereof for locking said last-mentioned means in a position wherein it can not cause the clapper to strike the gong.

In testimony whereof, I have hereunto signed my name.

JOHN H. SHARP.